United States Patent
Dekhil et al.

(10) Patent No.: US 6,522,768 B1
(45) Date of Patent: Feb. 18, 2003

(54) PREDICTING SYSTEM BEHAVIOR OF A MANAGED SYSTEM USING PATTERN RECOGNITION TECHNIQUES

(75) Inventors: Mohamed Dekhil, Sunnyvale, CA (US); Jerremy Holland, Los Altos Hills, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/494,842

(22) Filed: Jan. 31, 2000

(51) Int. Cl.$^7$ .............................. G06K 9/00; G06K 9/62; G06F 5/00

(52) U.S. Cl. ..................... 382/100; 382/224; 706/45; 706/48

(58) Field of Search .............................. 382/155, 156, 382/158, 159, 217, 219, 224, 226, 100; 717/105; 706/45, 48, 13; 702/187, 181

(56) References Cited

U.S. PATENT DOCUMENTS

| | | | |
|---|---|---|---|
| 4,849,879 A | * 7/1989 | Chinnaswamy et al. | 706/45 |
| 5,692,106 A | * 11/1997 | Towers et al. | 706/45 |
| 5,774,377 A | * 6/1998 | Eidson et al. | 702/187 |
| 5,930,780 A | * 7/1999 | Hughes et al. | 706/13 |
| 6,453,265 B1 | * 9/2002 | Dekhil et al. | 702/181 |

OTHER PUBLICATIONS

Spezialetti, M.; Kearns, J.P.; A general approach to recognizing even occurences in distributed computations, Jun. 13–17, 1998, ISBN 0–8186–0865–X.*

Dini, P.; Von Bochmann, G.; Boutaba,R.; Performance evaluation for distributed system components, Jun. 19–21, 1996, ISBN 0–8186–7442–3.*

Ben–Arieh, D.; Chopra, M.; Bleyberg, M.Z.; Data mining application for real–time distributed shop floor control, Oct. 11–14, 1998, ISBN 0–7803–4778–1.*

* cited by examiner

*Primary Examiner*—Jon Chang
*Assistant Examiner*—Brian Le

(57) ABSTRACT

A system for predicting system behavior of a managed system includes a measurement module coupled to the managed system to generate measurement data of the managed system. The measurement data include current measurement data and past measurement data. The past measurement data indicate a problem of the managed system. A pattern classification module is coupled to the measurement module to process the past measurement data into a plurality of representative pattern images, and to select a predictor pattern image that best identifies the problem from the pattern images. A pattern matching module is coupled to the pattern classification module and the measurement module to process the current measurement data into a plurality of pattern images using the same image processing technique that generates the predictor pattern image. The pattern matching module also identifies any pattern image that matches the predictor pattern image to predict the problem. A system for generating a predictor pattern image for predicting system behavior of a managed system is also described.

17 Claims, 10 Drawing Sheets

PREDICTING SYSTEM BEHAVIOR OF A MANAGED SYSTEM USING PATTERN RECOGNITION TECHNIQUES

BACKGROUND OF THE INVENTION

1. Field of the Invention

The present invention pertains to monitoring and measuring behavior of a managed system. More particularly, this invention relates to predicting system behavior of a managed system (e.g., a distributed application system) using image processing and pattern recognition techniques.

2. Description of the Related Art

As we know, one prior art monitoring solution for measuring a software application running on a computer system employs predetermined static threshold values to measure the performance of the application. FIG. 1 shows this prior art solution. The threshold value is determined based typically on experience and/or intuition. This prior art solution is acceptable for applications running on a single computer machine and involving very few measurements.

However, this prior art solution will not be suitable for measuring large dynamic distributed applications with hundreds of metrics. As is known, a distributed application system operates in a distributed or federated computing environment. Such an environment is typically characterized by independent computer systems in individual administrative domains that are loosely coupled by networks and cooperate to provide computing resources for a global application (i.e., the distributed application). One example of such a distributed application system is Internet.

One reason that the above-mentioned prior art solution will not be suitable for the large dynamic distributed applications with hundreds of metrics is that this simple prior art solution is typically not sufficient to capture complex correlation between various metrics. In particular, it is not sufficient to capture complex correlation between metrics on different computer systems in different administrative or control domains. Another reason is that this prior art approach is not flexible enough to incorporate the dynamic behavior of the distributed application, which may radically change over time.

Another problem associated with the above-mentioned prior art solution is that the use of predetermined static threshold values is sensitive to spikes in the measured data. For example and as can be seen from FIG. 1, if the value of one measurement exceeds the threshold for a short period of time due to a transient malfunction of the application, alarms will go off, notifying the existence of a problem. This will result in increased false positives, which can be very annoying, and in some cases, costly.

Another prior art approach to monitoring a system with thresholds is referred to as baselining. The main idea of baselining is to automatically determine what is "normal" or "expected" value of a metric or measurement. In general, a baseline is a representation of how a system behaves under normal conditions at various times. This is particularly useful for selecting threshold values that defines desirable or acceptable ranges for each of the metrics as a function of the baseline for that metric. FIG. 2 shows a threshold range that is defined as a function of the baseline 11. As can be seen from FIG. 2, the curve 12 shows the upper threshold of the baseline 11 and the curve 13 shows the lower threshold of the baseline 11.

The advantage of this approach is the ability to automatically select threshold values that takes into account the dynamic behavior of the system being monitored. However, problems are still associated with this prior art baselining approach. One problem is that the approach does not capture relationships between metrics, which reduces its predictive power and limits its use to single metric or predefined functions that represent known (and mostly simple) relationships. This means that the approach still looks at each individual measurement in isolation. Another problem associated with the approach is its sensitivity to several required parameters such as sampling rate and age factor. As a result, system behavior of the monitored system cannot be accurately predicted. The prior art approach can only indicate problems when the problems actually occur. Another problem is its inability to classify problems. It can only tell when a problem occurs.

These above described approaches detect problems when they occur, which may not give time to take actions to correct the problem, or prevent it from happening. Thus, there exists a need for predicting system behavior of a distributed application system ahead of time and with high degree of accuracy.

SUMMARY OF THE INVENTION

One feature of the present invention is to predict system behavior of a managed system.

Another feature of the present invention is to predict system behavior of a managed system with high degree of accuracy.

Another feature of the present invention is to predict, with high degree of accuracy, system behavior of a managed system using image processing and pattern recognition techniques.

A further feature of the present invention is to identify a set of patterns from system measurements of a managed system that can predict with high degree of accuracy potential problems of the managed system.

A further feature of the present invention is to allow simultaneous comparison of multiple measurement metrics by combining multiple measurement metrics into one image.

A system for predicting system behavior of a managed system includes a measurement module coupled to the managed system to generate measurement data of the managed system. The measurement data include current measurement data and past measurement data. The past measurement data contains an indication of a problem of the managed system. A pattern classification module is coupled to the measurement module to process the past measurement data into a plurality of representative pattern images, and to select one of the pattern images that best identifies the problem as a predictor pattern image. A pattern matching module is coupled to the pattern classification module and the measurement module to process the current measurement data into a plurality of pattern images using the same image processing technique that generates the predictor pattern image. The pattern matching module identifies any pattern image that matches the predictor pattern image to predict the problem in the managed system.

A system for generating a predictor pattern image for predicting system behavior of a managed system includes a storage that stores past measurement data that contains an indication of a problem of the managed system. A pattern classification module is coupled to the storage to process the past measurement data into a plurality of representative pattern images, and to select the predictor pattern image that best identifies the problem from the representative pattern images. The predictor pattern image predicts the occurrence of the problem by identifying any pattern of current measurement data of the managed system that matches the predictor pattern image.

Other features and advantages of the present invention will become apparent from the following detailed description, taken in conjunction with the accompanying drawings, illustrating by way of example the principles of the invention.

DETAILED DESCRIPTION OF THE INVENTION

Figure 1:
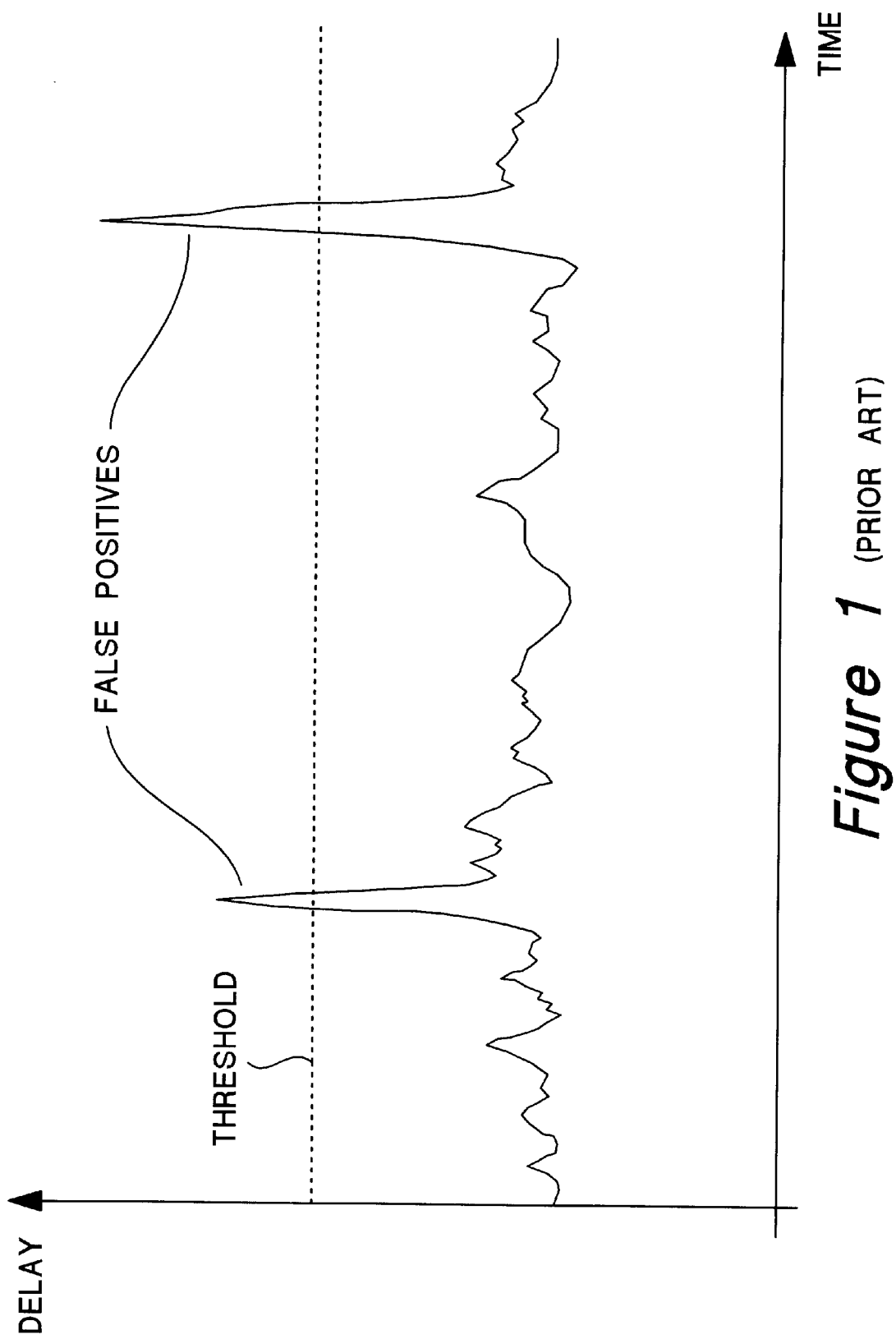
FIG. 1 shows one prior art approach of monitoring a system with predefined static thresholds.
Figure 2:
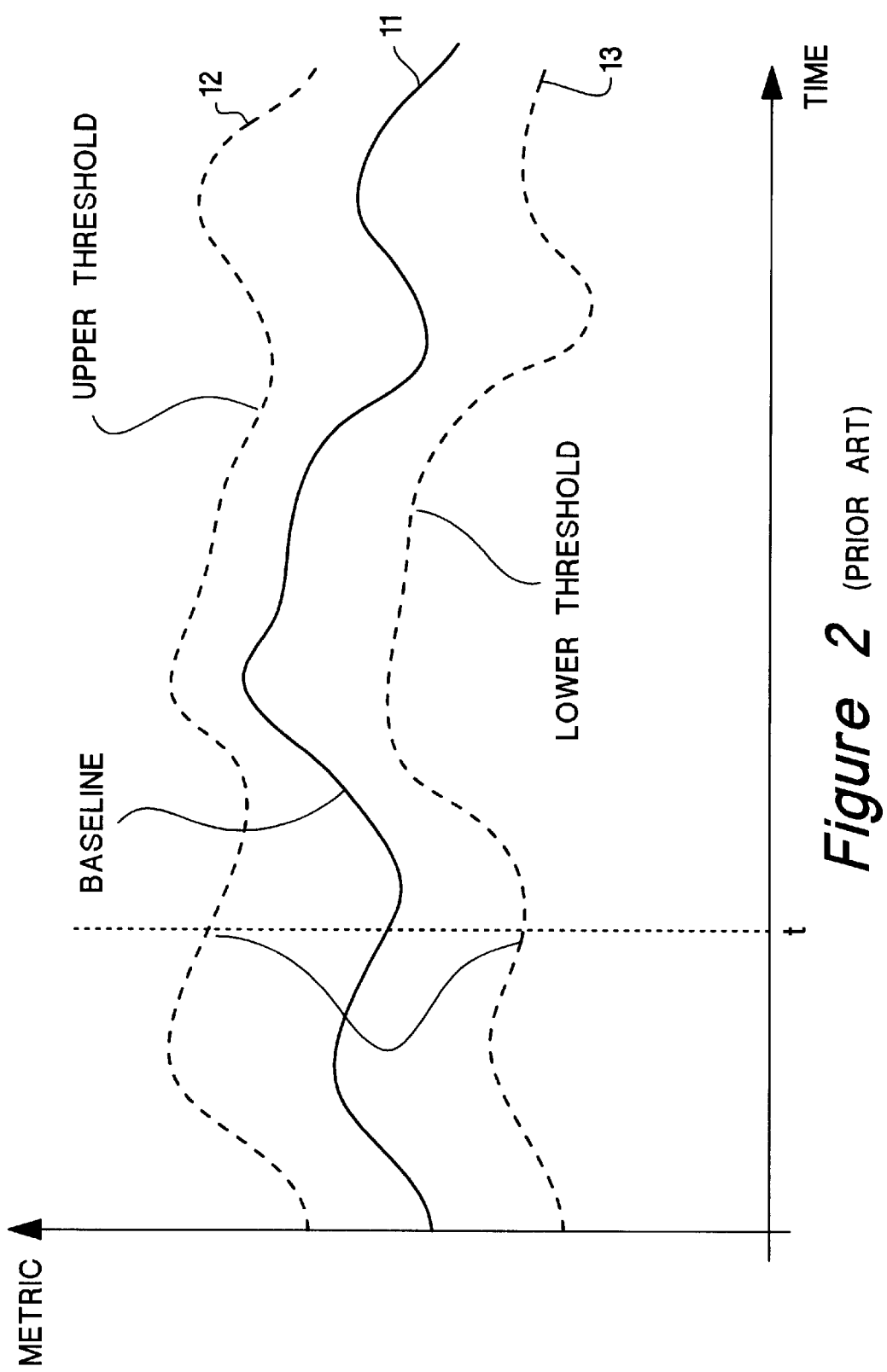
FIG. 2 shows another prior art approach of monitoring a system with a variable baseline threshold.
Figure 3:
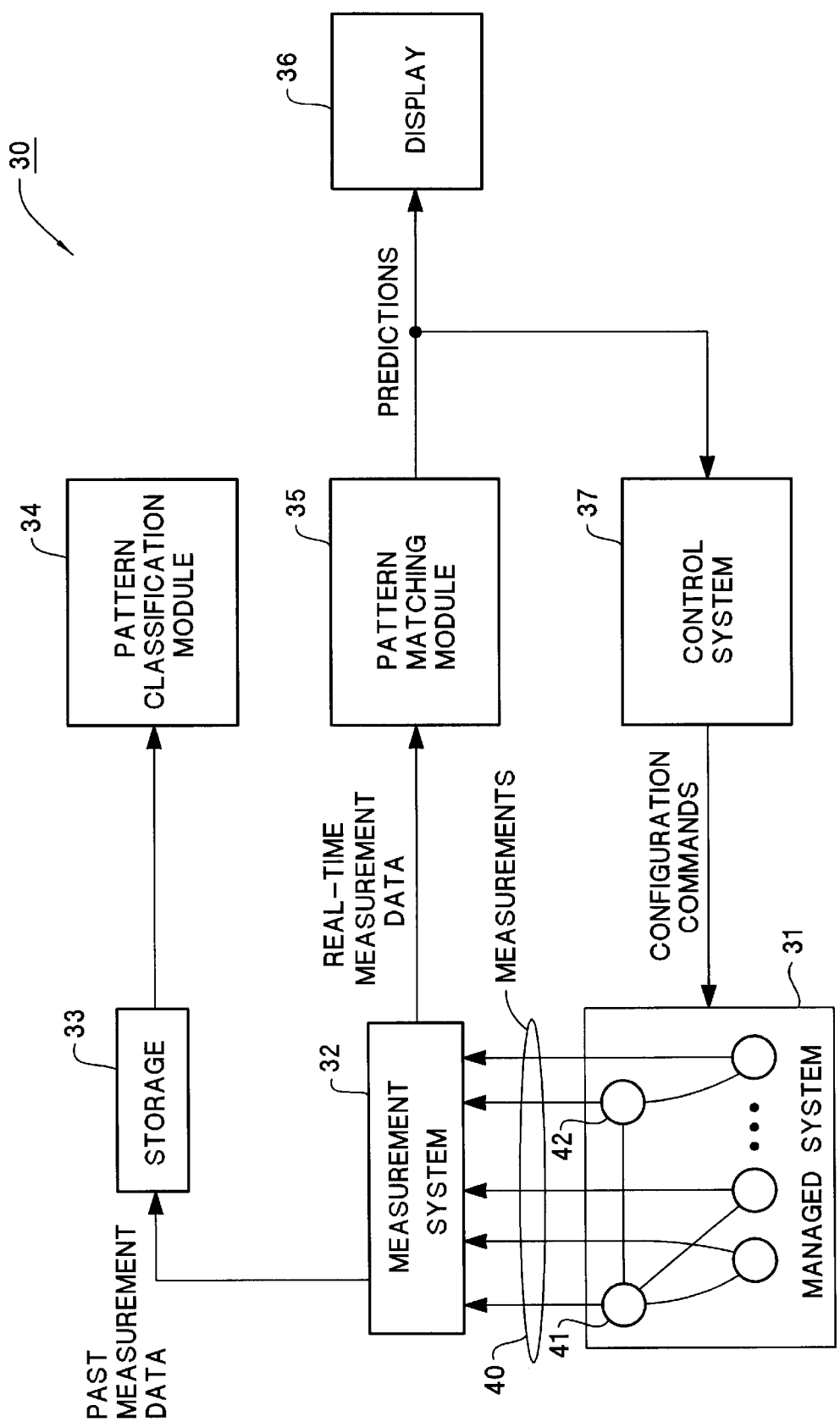
FIG. 3 shows an overview of a monitoring and measurement system that includes a pattern classification module and a pattern matching module in accordance with one embodiment of the present invention.

FIG. 3 shows an overview of a monitoring and measurement system 30 for a managed system 31. The managed system 31 can be a distributed system or a standalone system.

The monitoring system 30 predicts with high degree of accuracy the overall system behavior of the managed system 31 in accordance with one embodiment of the present invention. This means that the monitoring system 30 can predict when a problem will occur in the managed system 31 ahead of time.

The monitoring system 30 also allows simultaneous check of multiple measurement metrics to predict the system behavior of the managed system 31. The monitoring system 30 includes a measurement system 32, a storage 33, a pattern classification module 34, a pattern matching module 35, a display 36, and a control system 37.

As will be described in more detail below, the storage 33 stores past measurement data of the managed system 31 generated by the measurement system 32. The past measurement data include indication or indications of problem or problems to be predicted. The past measurement data are applied to the pattern classification module 34. The past measurement data include multiple measurements, in one embodiment.

Figure 6A:
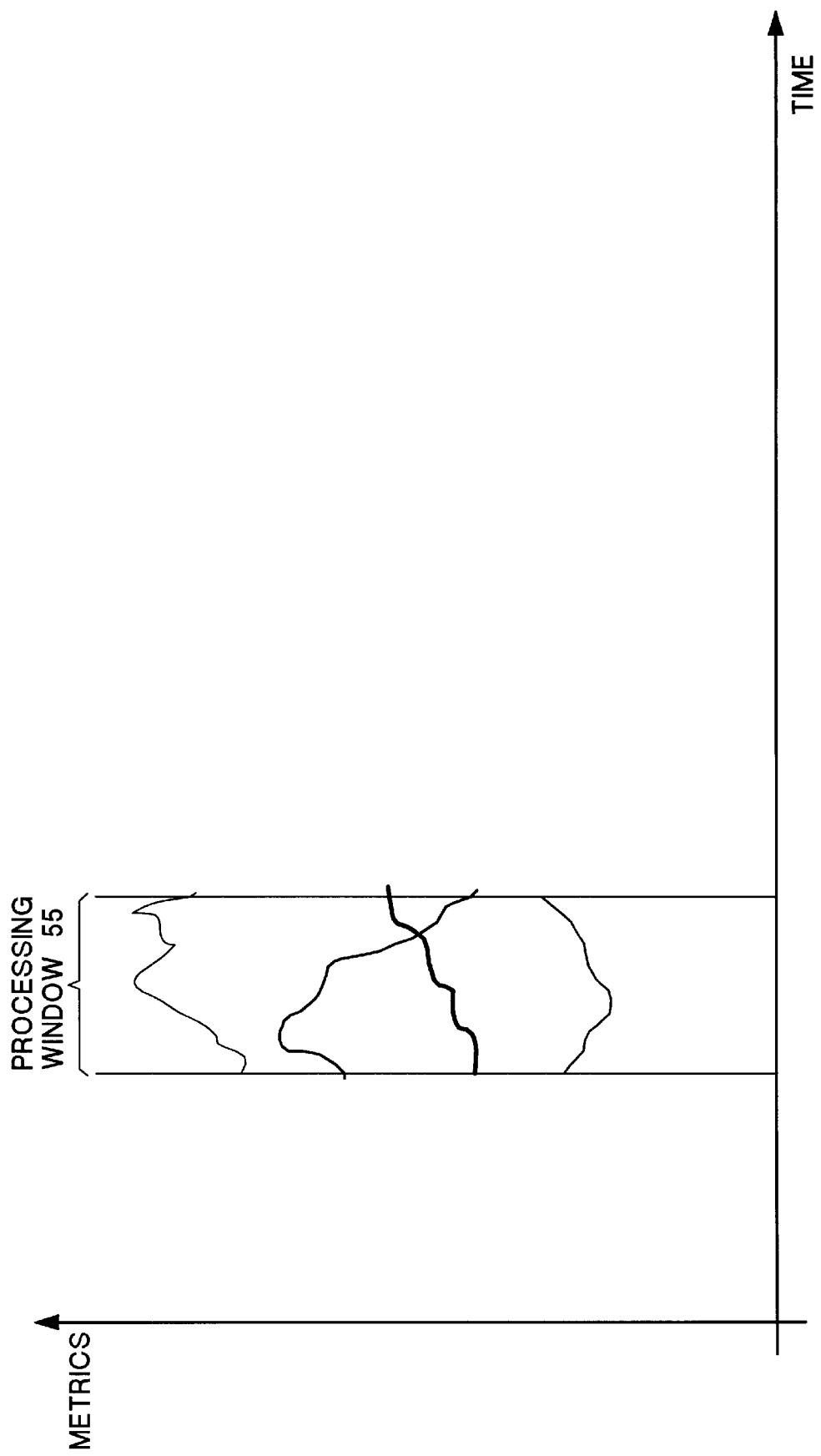
FIGS. 6A and 6B show the conversion of the measurement metrics into a grey scale pattern image by the pattern classification module of FIGS. 3 and 5.
Figure 6B:
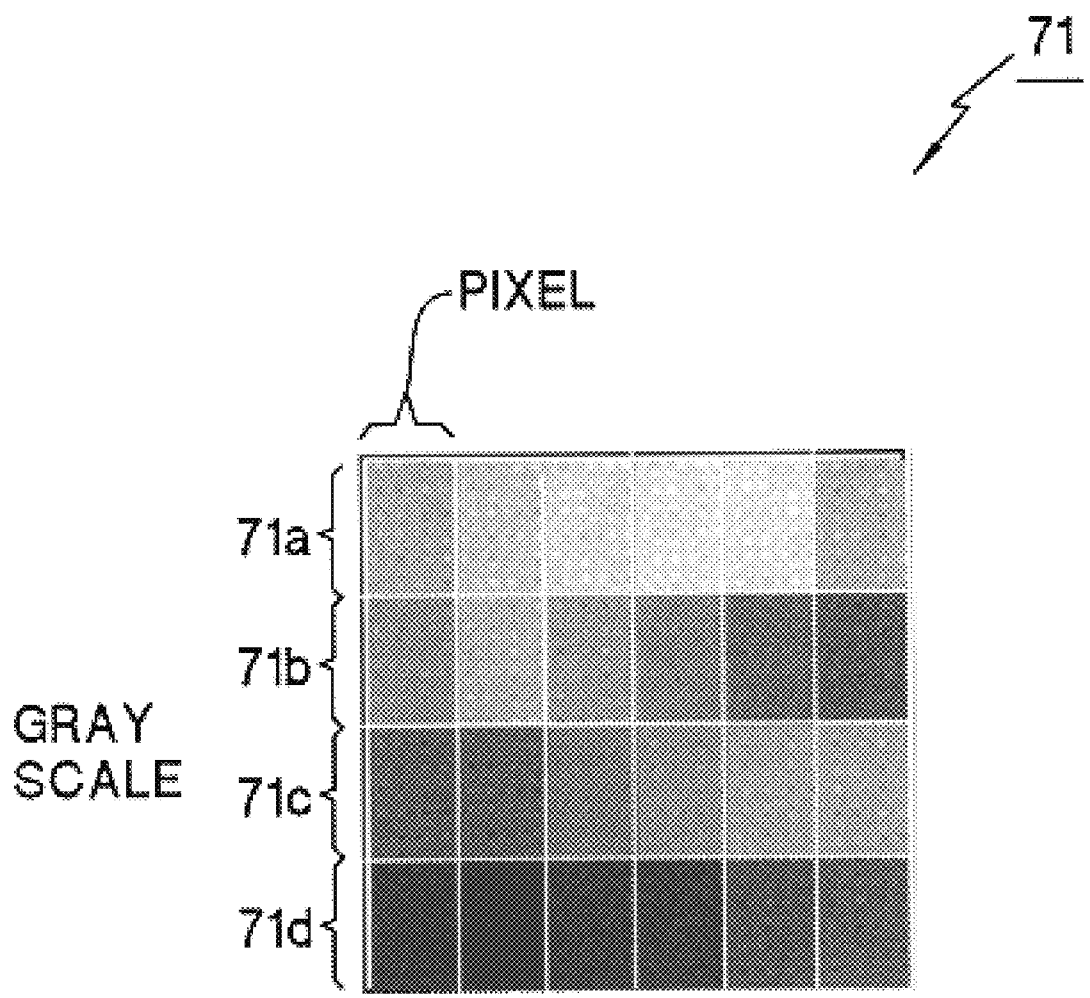
Figure 6C:
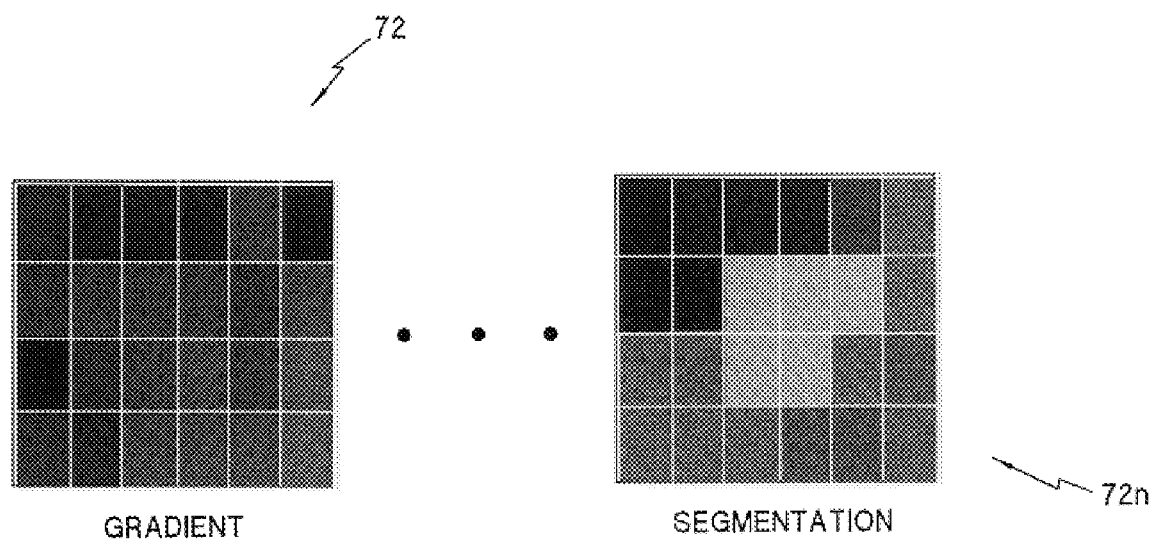
FIG. 6C shows other pattern images derived from the grey scale pattern image of FIG. 6B by the pattern classification module of FIGS. 3 and 5 using image processing techniques.

The pattern classification module 34 processes the past measurement data into a plurality of representative pattern images. The pattern classification module 34 first divides the past measurement data into a number of portions over time, each within a processing window (see FIGS. 4 and 6A). The portion of the past measurement data that indicates the problem is then converted into a pattern image. This is done by digitizing each measurement into a grey scale row in the image. The rows are then put together to form the pattern image. This grey scale pattern image is then converted into other representative pattern images using image processing techniques (e.g., gradient analysis, texture representation, sharpening/edge detection, or image segmentation). The pattern classification module 34 then identifies one of the representative pattern images that best identifies the problem as the predictor pattern image.

The predictor pattern image is then sent to the pattern matching module 35 to identify any pattern from the current measurement data of the managed system 31 that matches the predictor pattern image in order to accurately predict the occurrence of the problem in the managed system 31. The pattern matching module 35 processes the current measurement data into pattern images using the same image processing technique that generates the predictor pattern image in order to allow the comparison.

One advantage of the monitoring system 30 is that pre-knowledge of system behavior of the managed system 31 is not required. Pre-knowledge of the system behavior is necessary if thresholds for various measurements were to be determined and measurements were to be compared with the predetermined thresholds. This reduces the amount of work required to determine and update monitoring policies and increases the out-of-box value of the management solution.

Another advantage of the monitoring system 30 is that representing measurement data in digital image form allows for the use of a variety of tools and means from computer vision and digital image processing and transformation fields for transforming and analyzing these metrics in a unified and homogenous fashion, regardless of scale or unit. A further advantage is that the monitoring system 30 can classify and recognize the behavior of a distributed application spanning over many physical systems. In addition, all the measurement data available are used to classify the system behavior of the managed system 31, which provides higher prediction power. In this case, multiple measurements are used to predict system behavior of the managed system 31 simultaneously. This is done by converting and combining multiple measurements into one image. Moreover, image compression techniques can be used to reduce time and space required for the image matching process. The monitoring system 30 will be described in more detail below, also in conjunction with FIGS. 3–8.

As can be seen from FIG. 3, the managed system 31 can be any kind of distributed or standalone system or target being monitored. In one embodiment, the managed system 31 is a distributed software application program running on a federated or distributed computing environment. In another embodiment, the manage system 31 is an Internet/Intranet application system. Alternatively, the managed system 31 can be any other system or target.

The measurement system 32 is used to monitor the managed system 31, and to generate measurements of the managed system 31. The measurement system 32 does this by taking various measurements at various locations or execution stages (e.g., the locations 41 or 42) of the managed system 31. This can be done using any known instrumentation and measurement techniques.

The measurements obtained by the measurement system 32 reflect the overall performance and availability of the managed system 31 at the time when the measurements are taken. This means the measurements can be analyzed to determine or predict if the managed system 31 is problematic or not. As is known, the behavior of a system is characterized by the trend and correlation of a collection of measurements over a period of time. The measurements obtained by the measurement system 32 can be continuous or non-continuous. As stated above, the measurement data may be multi-metric measurement data (i.e., including multiple measurements). The measurements can also be referred to as measurement data.

The measurement data generated by the measurement system 32 include the past measurement data and the current measurement data. The past measurement data indicate past performance and availability of the managed system 31 (can be a few minutes, a few hours, a day, a month, or a year in the past) while the current data indicate the current or present system behavior of the managed system 31. The past measurement data can be obtained by the measurement system 32 in real-time manner in the past over a predetermined time period. In one embodiment, the past measurement data include multiple measurement metrics (see FIG. 4). Alternatively, the past measurement data are simulated (i.e., man-created) data that are not obtained from the managed system 31. The simulated data typically reflect simulated problematic system behavior of the managed system 31. The past data are marked or labeled at the occurrence of each problem.

The current measurement data indicate the present or current behavior of the managed system 31. The current measurement data are also obtained in real-time fashion by the measurement system 32. The difference between the past measurement data and the current measurement data is that the past measurement data indicate past system behavior (or possible problematic system behavior) while the current measurement data indicate present system behavior of the managed system 31. The measurement system 32, however, does not predict system behavior of the managed system 31. The measurement system 32 can be implemented using any known monitoring means. In addition, the collection of the measurement data by the measurement system 32 can also be done using any known technology.

In one embodiment, the measurement system 32 is embedded in the managed system 31. This means that when, for example, the managed system 31 is a software application, the measurement system 32 can also be a software program. In this case, the measurement system 32 can be a single module software program or multi-module software program. In another embodiment, the measurement system 32 is an independent system separate from the managed system 31. The measurement system 32 can also be referred to as a measurement module.

The storage 33 stores the past measurement data of the managed system 31. Alternatively, the past measurement data stored in the storage 33 can be replaced with simulated data that reflect real-time system behavior of the managed system 31. The training data can be a mixture of past measurement data and man-created data. The storage 33 can be implemented by any known storage means (e.g., disk storage, CD-ROM storage, volatile or non-volatile memory storage) and could use any software technique for storing the data (e.g., database system, text file, etc.).

The past measurement data indicate the system behavior of the managed system 31. This means that a portion of the past measurement data identifies or predicts a problem of the managed system 31. Thus, the entire past measurement data over a time sequence may include one portion that indicates or predicts the problem of the managed system 31 (FIG. 3).

Figure 4:
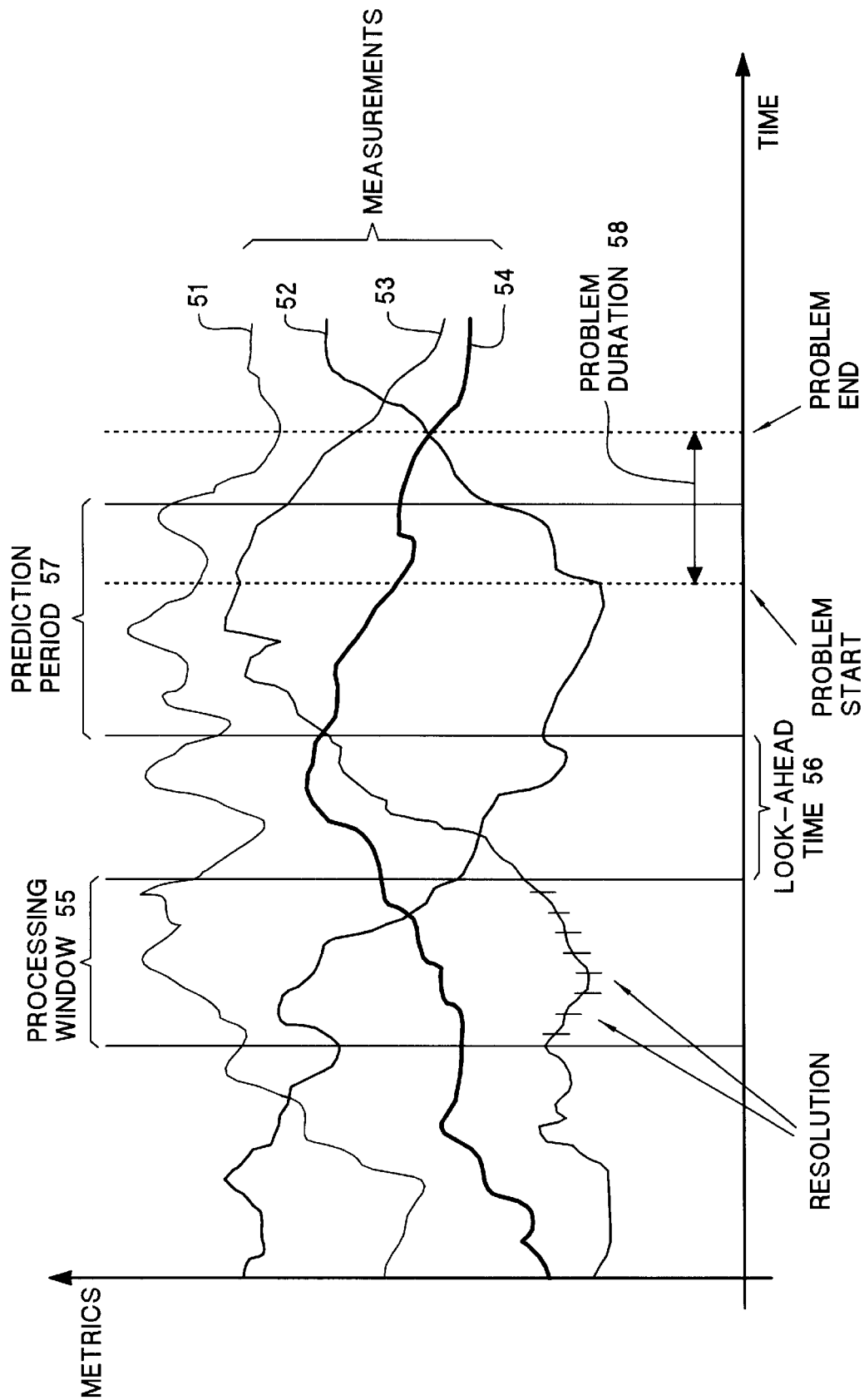
FIG. 4 shows sample, data and the different variables for predicting system behavior of a managed system.

FIG. 4 shows one example of a time sequence of the past measurement data. As can be seen from FIG. 4, the past measurement data include multiple measurements. FIG. 4 only shows the measurements 51–54 for illustration purposes. In practice, many more measurements than those measurements 51–54 may be included. FIG. 4 also shows the marks or indications (i.e., problem duration 58) when a problem started and stopped. Again, FIG. 4 only shows one problem for illustration purposes. This means that the past measurement data will be treated in the following description as indicative of only one problem.

One portion of the past measurement data shown in FIG. 4 indicate or predict the problem. To find out which portion the past measurement data of FIG. 4 best indicates or predicts the problem, a processing window slides along the measurement data, and the measurements within the processing window are converted into a grey scale image. (Alternatively, the measurement data are divided into a number of portions of equal size, each within a processing window.)

FIG. 4 shows that one portion of the past measurement data are within the processing window 55. The processing window is a sliding window that represents the period of time needed to identify and classify a behavior pattern (e.g., a problem) of the managed system 31. The processing window is of a predetermined time period. Wider windows provide better characterization of the pattern, which leads to better estimation accuracy. On the other hand, the processing overhead increases with larger windows.

The job of the pattern classification module 34 of FIG. 3 is to convert the past measurement data into a number of pattern images and identify or classify one of the images that best predicts or indicates the problem as the predictor pattern image.

The problem duration 58 shown in FIG. 4 is the period of time in which the problem persisted. This parameter can be used to reduce the effect of transient problems, which may result from spikes in the measurement data. As can be seen from FIG. 4, a look-ahead time 56 and a prediction period 57 are between the processing window 55 and the problem duration 58. The prediction period 57 is partially overlapped with the problem duration 58. The prediction period 57 is the period of time in which the problem is predicted to occur with certain probability. The ideal situation is to have this prediction period 57 as narrow as possible to provide more concise prediction of the problem.

The look-ahead time 56 is the time between the end of the processing window 55 and the start of the prediction period 57. The ideal situation is to have this period longer so the monitoring system 30 can have time to take correction actions without sacrificing the prediction accuracy. When this period approaches zero, it becomes a detection of the problem.

Referring to FIGS. 3 and 4, the pattern classification module 34 receives the past measurement data from the storage 33. The pattern classification module 34 divides the past measurement data into a number of portions, each within a processing window. The pattern classification module 34 then digitally converts the past measurement data within each processing window (e.g., the processing window 55) into a pattern image. The pattern classification module 34 then derives a number of other representative pattern images of other representations from the converted pattern images using image processing and transformation techniques. The pattern classification module 34 then classifies one pattern image from one representation that best identifies the problem of the managed system 31 as the predictor pattern image. These will be described in more detail below.

Figure 5:
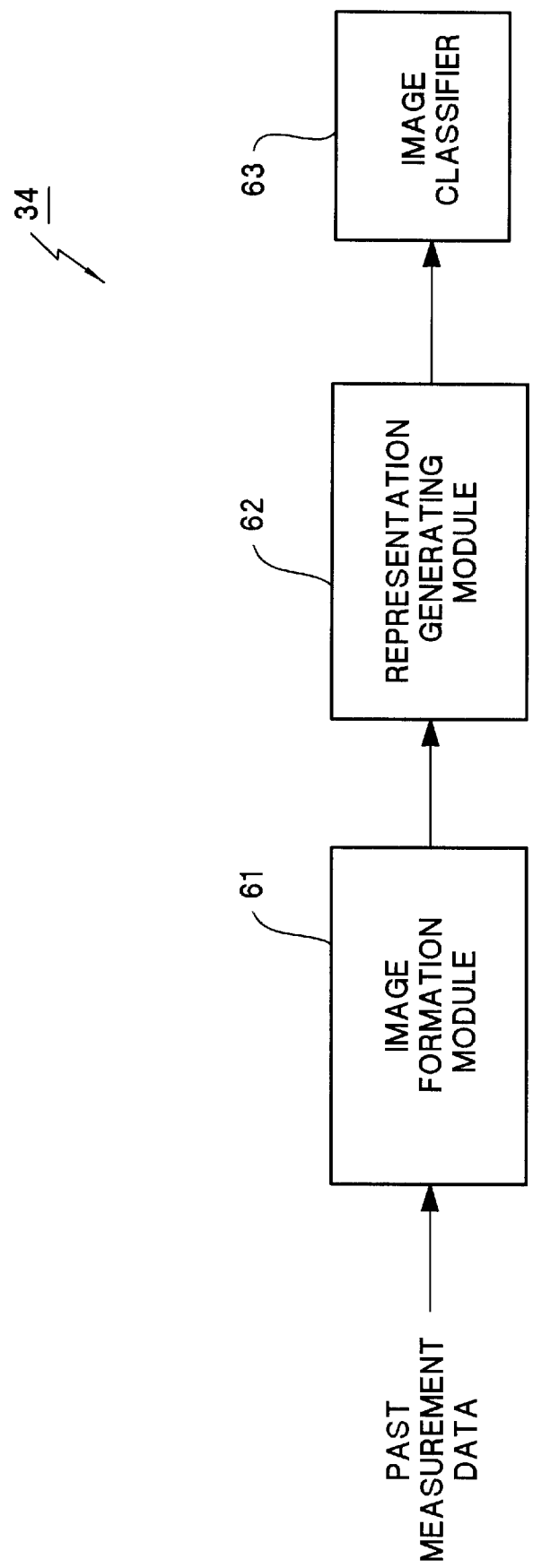
FIG. 5 shows in block diagram the structure of the pattern classification module of FIG. 3.

FIG. 5 shows the structure of the pattern classification module 34 of FIG. 3. As can be seen from FIG. 5, the pattern classification module 34 includes an image formation module 61, a representation generation module 62, and an image classifier 63. The image formation module 61 is used to convert the portion of the past measurement data that identifies the occurrence of the problem into a pattern image. This means that the image formation module 61 converts the past measurement data within each processing window into a pattern image. For example, the image formation module 61 converts the past measurement data within the processing window 55 into a pattern image 71 (see FIGS. 4 and 6A) so that the representation generation module 62 can derive other representative pattern images of other representations from the converted pattern image using image processing and transformation techniques.

As can be seen from FIGS. 4–6A, the image formation module 61 digitally converts the past measurement data within the processing window 55 into a pattern image 71 (FIG. 6B), in which each of the rows 71a–71d represents one of the measurements 51–54 (FIG. 4). In this case, each row is formed by image pixels and the number of image pixels in each row is equal to the number of measurement samples from the measurement within the processing window 55. The number of measurement samples are controlled by the sampling rate, which can be different for each measurement depending on the rate of change of the corresponding measurement. Each measurement sample corresponds to one pixel of the row. This means that the grey or intensity scale of each pixel of the row represents the digitized sample value of the corresponding measurement sample. The image formation module 61 can be implemented using any known means.

In one embodiment, the converted pattern image 71 is classified as the predictor pattern image. In this case, the pattern classification module 34 (FIG. 3) need not have the representation generating module 62 (FIG. 5) and the converted pattern image 71 is directly sent to the image classifier 63 (FIG. 5) to be classified as the predictor pattern image. In another embodiment, the pattern image 71 is then sent to the representation generating module 62 to derive other representative pattern images (e.g., the pattern images 72–72n in FIG. 6C) from the pattern image 71 using image processing or transformation techniques. This is to improve prediction accuracy of the predictor pattern image. The purpose of this is to find which one of a number of representative pattern images of the measurement data within the processing window 55 best classifies or identifies the problem.

The image processing or transformation techniques used by the representation generating module 62 can be any known image processing or transformation techniques. These derived representative pattern images are based on different predetermined and identifiable characteristics (e.g., texture representation, sharpening/edge detection, and image segmentation). This means the representation generating module 62 scans the converted pattern image 71 for one of the predetermined characteristics to generate the representative pattern images 72–72n. For example, the representation generating module 62 can employ gradient analysis to derive the pattern image 72 (FIG. 6C) from the pattern image 71. The gradient image 72 presents the rate of change in the pattern image 71.

Figure 7:
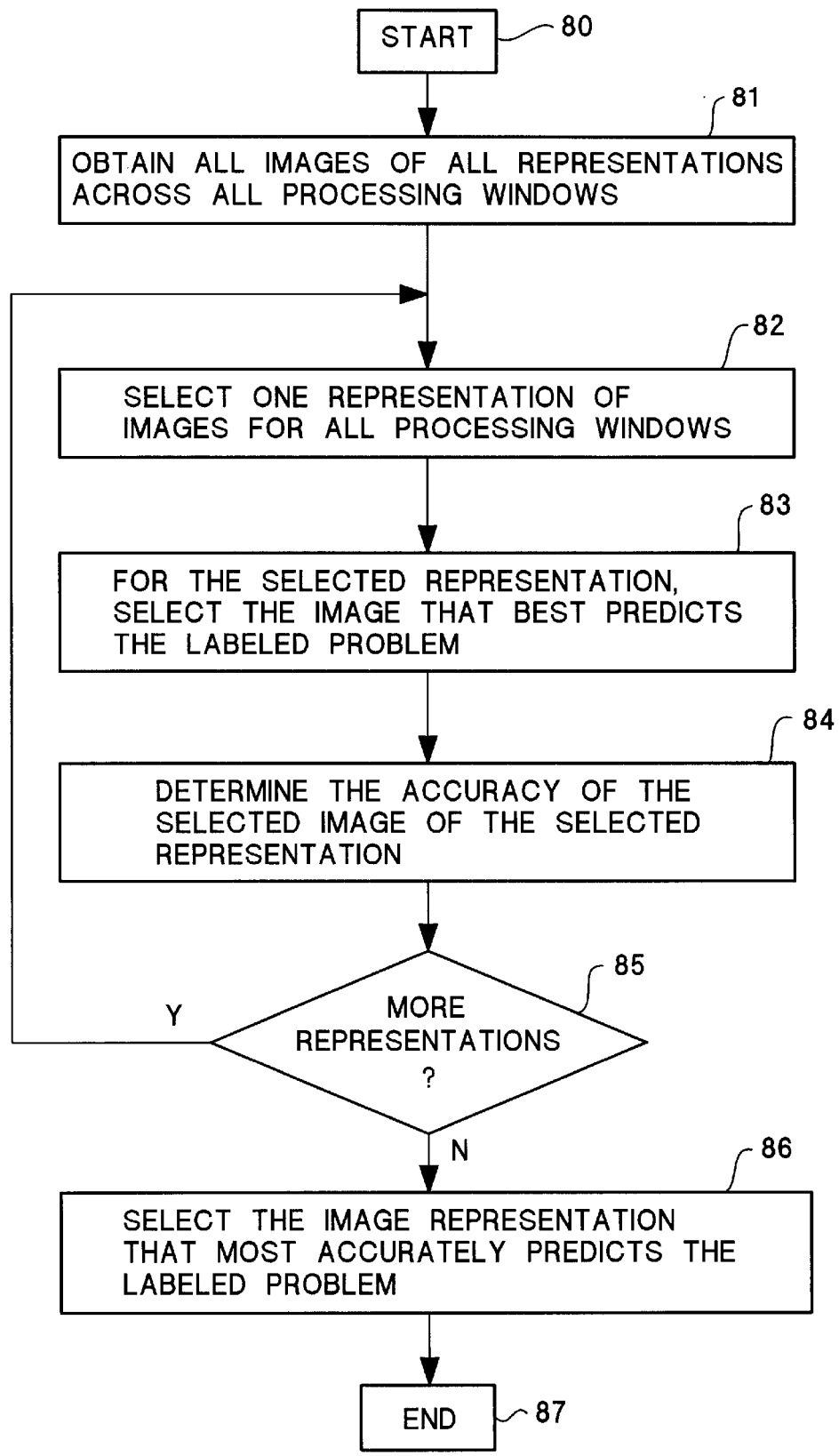
FIG. 7 shows in flow chart diagram form the process of the image classifier of FIG. 5.

FIG. 7 shows the process of the pattern classifier 63 to identify and classify one of the pattern images generated from the representation generating module 62 by the pattern classifier 63 of FIG. 5. As can be seen from FIGS. 5 and 7, the process starts at the step 80. At the step 81, all the images from all representations across all processing windows are collected. Then the step 82 is performed at which one representation of images for all processing windows is selected. At the step 83, the pattern classifier 63 selects the image from all the images of the selected representation that best predicts the labeled problem. At the step 84, the pattern classifier 63 determines the accuracy of the selected image of the selected representation. The step 85 is a judgment step, at which it is determined if there are unchecked representations. If so, the steps 82–84 are repeated. If not, the step 86 is performed, at which the image representation that most accurately predicts the labeled problem is selected or classified as the predictor pattern image. The process then ends on the step 87.

Referring back to FIG. 3, the pattern classification module 34 sends the extracted predictor pattern image or images to the pattern matching module 35. The pattern matching module 35 is also connected to the measurement system 32 to receive the current measurement data. The measurement system 32 obtains the current measurement data the same way it obtains the past measurement data. The measurement system 32 then sends the current measurement data to the pattern matching module 35.

In one embodiment, the measurement system 32 send the measurement data in a continuous stream fashion to the pattern matching module 35. The pattern matching module 35 applies the measurement data to a sliding processing window (not shown). The sliding processing window is of the same length as the processing window 55 (FIGS. 4 and 6A) and moves along the time axis for a predetermined distance after each predetermined time interval. This means that the measurement data within two adjacent sliding windows may have overlapping portions if the sliding processing window does not move far enough along the time axis. The pattern matching module 35 then converts the current measurement data partitioned by the sliding processing window into pattern images the same way the predictor pattern image is generated.

In another embodiment, the pattern matching module 35 divides the time period of the received continuous current measurement data into a number of non-overlapping processing windows, each being of the same length as the processing window 55. The pattern matching module 35 then converts the current measurement data within each of the processing windows into a pattern image the same way the predictor pattern image is generated.

In a further embodiment, the measurement system 32 accumulates the current measurement data for a time period equal to that of the processing window 55, and then sends the measurement data to the pattern matching module 35 in a batch. This process is repeated by the measurement system 32. This means that the measurement system 32 periodically sends the current measurement data within a time window the same size as the processing window 55 to the pattern matching module 35.

The pattern matching module 35 then converts the current measurement data within each window into a pattern image in the same way the predictor pattern image is generated. For example, if the predictor pattern image is the pattern image 71, then the pattern matching module 35 only digitally converts the measurements into a grey scale pattern image in the same way the image formation module 61 (FIG. 5) of the pattern classification module 34 generates the pattern image 71. If the predictor pattern image is the pattern image 72 (FIG. 6C), then the pattern matching module 35 converts the current measurement data into a gradient pattern image in the same way the representation generating module 62 (FIG. 5) of the pattern classification module 34 generates the pattern image 72.

Then the pattern image derived by the pattern matching module 35 is compared with the predictor pattern image to see if they match. This can be implemented using any known image pattern matching techniques. For example, the pattern matching technique employed can be a feature-based pattern recognition technique which is known in the art. As a further example, the pattern matching technique employed by the pattern matching module 35 can be a statistical pattern recognition technique, which is also known in the art.

Using the predictor pattern image, the pattern matching module 35 can detect if any pattern image of the current measurement data matches the predictor pattern image. If so, the pattern matching module 35 accordingly outputs predictions. This allows the monitoring system 30 to predict the system behavior (e.g., performance violations) of the managed system 31 with high degree of accuracy.

Figure 8:
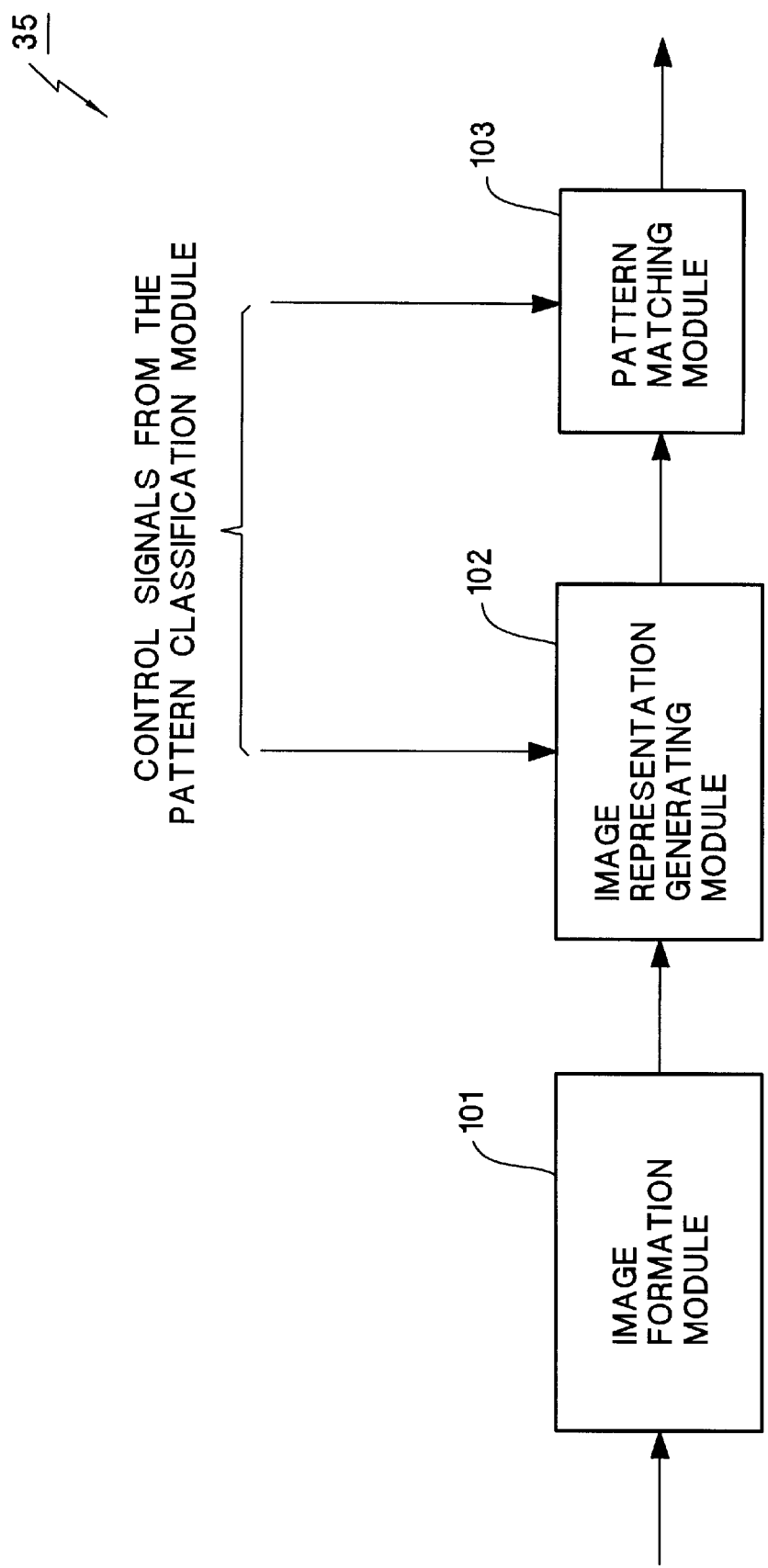
FIG. 8 shows in block diagram the structure of the pattern matching module of FIG. 3.

FIG. 8 shows the structure of the pattern matching module 35, which includes a image formation module 101, a representation generating module 102, and a pattern matching module 103. The image formation module 101 is the same as the image formation module 61 (FIG. 5) of the pattern classification module 34, both in terms of function and configuration. The representation generating module 102 may also be substantially the same as the representation generating module 62 (FIG. 5) both in terms of function and configuration. One difference is that the representation generating module 102 is controlled by the pattern classifier 63 (FIG. 5) of the pattern classification module 34 to only derive one representative pattern image in the same way the predictor pattern image is obtained such that the two images can be compared. The pattern matching module 103 can be implemented using any known means and employs any known image pattern matching techniques, such as the feature-based pattern recognition technique, or the statistical pattern recognition technique.

Referring back to FIG. 3, the predictions from the pattern matching module 35 are then fed to the display 36 for display. This allows the system administrator of the managed system 31 to view the predictions, and to take appropriate actions accordingly. The user actions can be through the control system 37 or directly at the managed system 31.

In addition, the predictions from the pattern matching module 35 can also be fed to the control system 37. This means that the predictions generated by the pattern matching module 35 can also be used to control or adjust the managed system 31 in such a way that the predicted performance violation or problem is avoided or corrected. The control system 37 sends configuration commands to the measurement system 32. The measurement system 32 in turn generates actions that cause certain reconfiguration or adjustment actions to take place in the managed system 31. This means that the control system 37 can configure (either dynamically or statically) the managed system 31. For example, when the pattern matching module 35 generates a performance violation prediction that will occur within a predicted time period, the control system 37 can adjust the managed system 31 (e.g., decrease the load, increase resource availability) so as to correct the situation before the performance violation actually happens. The control system 37 can be implemented using any known means and is dependent upon the structure of the managed system 31.

In the foregoing specification, the invention has been described with reference to specific embodiments thereof. It will, however, be evident to those skilled in the art that various modifications and changes may be made thereto without departing from the broader spirit and scope of the invention. The specification and drawings are, accordingly, to be regarded in an illustrative rather than a restrictive sense.

What is claimed is:

1. A system for generating a predictor pattern image for predicting system behavior of a managed system, comprising:

(A) a storage that stores past measurement data that indicate a problem of the managed system;

(B) a pattern classification module coupled to the storage to process the past measurement data into a plurality of representative pattern images, and to select the predictor pattern image that best identifies the problem from the representative pattern images, wherein the predictor pattern image predicts the occurrence of the problem by identifying any pattern of current measurement data of the managed system that matches the predictor pattern image.

2. The system of claim 1, wherein each of the representative pattern images generated by the pattern classification module includes multiple measurements of the past measurement data to allow for comparison of multiple measurements simultaneously.

3. The system of claim 1, wherein the pattern classification module processes the past measurement data by converting a portion of the past measurement data that indicates the problem into a converted representative pattern image, and deriving other representative pattern images from the converted pattern image using various image processing techniques;

identifying one of the representative pattern images that best indicates the problem as the predictor pattern image.

4. The system of claim 3, wherein the converted pattern image is a grey scale image based on values of the measurement data, wherein the other representative pattern images are also grey scale images and the image processing techniques include gradient analysis, texture representation, sharpening/edge detection, and image segmentation.

5. The system of claim 1, wherein the pattern classification module further comprises an image formation module that divides the past measurement data into a plurality of measurement data portions, each within a processing window and having multiple measurements, wherein one of the measurement data portions indicates the problem, wherein the image formation module also converts the measurement data portion that indicates the problem into a converted representative pattern image;

a representation generating module that derives other representative pattern images from the converted pattern image using various image processing techniques;

an image classifier that identifies one of the representative pattern images that best indicates the problem as the predictor pattern image.

6. The system of claim 5, wherein the converted pattern image is a grey scale image based on values of the predicting measurement data pattern, wherein the other representative pattern images are also grey scale images and the image processing techniques include gradient analysis, texture representation, sharpening/edge detection, and image segmentation.

7. The system of claim 1, wherein the managed system is a distributed application system and the predictor pattern image is used by a pattern matching module to identify any matching pattern in the current measurement data of the managed system in order to predict occurrence of the problem.

8. A system for predicting system behavior of a managed system, comprising:
- (A) a measurement module coupled to the managed system to generate measurement data of the managed system, wherein the measurement data include past measurement data and current measurement data, wherein the past measurement data indicate a problem of the managed system;
- (B) a pattern classification module coupled to the measurement module to process the past measurement data into a plurality of representative pattern images, and to select one of the representative pattern images that best identifies the problem as a predictor pattern image;
- (C) a pattern matching module coupled to the pattern classification module and the measurement module to process the current measurement data into a plurality of pattern images using the same image processing technique that generates the predictor pattern image, and to identify any pattern image of the current measurement data that matches the predictor pattern image to predict the problem in the managed system.

9. The system of claim 8, wherein each of the representative pattern images generated by the pattern classification module includes multiple measurements of the past measurement data to allow for comparison of multiple measurements simultaneously.

10. The system of claim 8, wherein the pattern classification module processes the past measurement data by
- converting a portion of the past measurement data that indicates the problem and has multiple measurements into a converted representative pattern image, and deriving other representative pattern images from the converted pattern image using various image processing techniques;
- identifying one of the representative pattern images that best indicates the problem as the predictor pattern image.

11. The system of claim 10, wherein the converted pattern image is a grey scale image based on values of the measurement data, wherein the other representative pattern images are also grey scale images and the image processing techniques include gradient analysis, texture representation, sharpening/edge detection, and image segmentation.

12. The system of claim 8 wherein the pattern classification module further comprises
- an image formation module that divides the past measurement data into a plurality of measurement data portions, each within a processing window and having multiple measurements, wherein one of the measurement data portions indicates the problem, wherein the image formation module also converts the measurement data portion that indicates the problem into a converted representative pattern image;
- a representation generating module that derives other representative pattern images from the converted pattern image using various image processing techniques;
- an image classifier that identifies one of the representative pattern images that best indicates the problem as the predictor pattern image.

13. The system of claim 12, wherein the converted pattern image is a grey scale image based on values of the predicting measurement data pattern, wherein the other representative pattern images are also grey scale images and the image processing techniques include gradient analysis, texture representation, sharpening/edge detection, and image segmentation.

14. The system of claim 8, wherein the pattern matching module further comprises
- an image formation module that collects the current measurement data over a predetermined time period, wherein the current measurement data have multiple measurements;
- an image representation generating module that converts the current measurement data into a pattern image using the same image processing technique that generated the predictor pattern image;
- a pattern matcher that compares the pattern image of the current measurement data with the predictor pattern image, wherein the pattern matching module predicts the occurrence of the problem if the pattern image matches the predictor pattern image.

15. The system of claim 8, wherein the managed system is a distributed application system, wherein the system further comprises a control system coupled to the pattern matching module and the measurement module to send configuration commands to control the managed system based on the prediction of the pattern matching module.

16. The system of claim 8, further comprising a storage that stores the past measurement data of the managed system generated by the measurement module.

17. The system of claim 8, further comprising a display coupled to the pattern matching module to display comparison indication of the pattern matching module.

* * * * *